United States Patent Office 3,100,709
Patented Aug. 13, 1963

3,100,709
PROCESS FOR IMPROVING PARTICLES OF PROTEIN CONTAINING VEGETABLE PRODUCTS AND PRODUCTS THEREOF
Twila M. Paulsen, Minneapolis, Minn., assignor to Archer-Daniels-Midland Company, Minneapolis, Minn., a corporation of Delaware
No Drawing. Filed Dec. 15, 1960, Ser. No. 75,923
10 Claims. (Cl. 99—98)

This invention relates to an improvement in the method of processing particulate protein containing vegetable materials requiring modification for extending edibility and particularly concerns rendering members of the legume family in the particulate form of flour, flakes, grits, meal and the like more readily acceptable for use in foods for human consumption, and the improved products obtained therefrom and therewith. More specifically this improvement relates to the process of chemical modification of high solids concentrations of particulate soybean meal or flake material in a relatively dry state, with water soluble ionizable acids and water soluble ionizable salts thereof in combination with hydrogen peroxide to thereby change the normal functional characteristics of soybean's odor and bitter taste and improving its adaptation and use in edible and nutritional applications.

In the field of foods, the lack of nutritional protein and other essential food constituents is well known to the art. Particularly is this true of the present day cereal-based products and there is a desire for an economical high soybean protein content food in a desired palatable state. The art is also aware of the high content of the many valuable food constituents present in soybean products. Despite this knowledge, the art is still without information of how to process soybean meal and the like in order to retain its baking quality for making it practically usable without soy odor and taste in edible foodstuffs. The desire of the art is to utilize soybean flour and the like at a significant levels high enough to improve nutritional properties of the food. Insofar as the art is aware and the continued efforts of industry, all attempts known to date for utilizing soybean materials in foods resulted in material retention of the soybean taste, odor, color or other detrimental characteristics. Many modifications of soybean meal material, by means of processing and/or additives, have been attempted in order to improve and render the soybean products more palatable. In Patent No. 1,510,606 issued to Philips, a process was disclosed for treating soy meal with a calcium chloride solution to improve calcium deficiency and modify the albuminous substances. This was to increase the calcium content for animal feed and no recognition of this treatment alone for changing odor, taste, or color and other detrimental characteristics can be found. In spite of this knowledge, it is still found that the bitter soybean taste appears to have continued to persist to an extent that it prevents any use of soy meal and like material in many products and only at very low levels in others. Thus, the art fails to provide for a commercially economical and feasible treatment for improving commercial production and commercial use of relatively native soy protein material, at high levels, as a food product for human consumption. Particularly, it cannot be found wherein any of the known art provided for any improvement in extending the uses of soybean products in foods for human consumption.

Accordingly, it is an object of this invention to provide an improved process for chemically treating particulate protein containing vegetable material in a relatively dry state with the combination of a simultaneous or step-wise application of water soluble protonic acids and/or their water soluble ionizable salts in conjunction with hydrogen peroxide to modify the protein products while they are retained in a relatively dry state; without the necessity of subsequent isolation or partial isolation; with the surprising and unexpected result of improving the soybean material by substantially entirely eliminating the soy odor and flavor, without impairing, and unexpectedly improving, the preparation and finished quality of products in which the so treated vegetable material is used.

More particularly, it is an object of this invention to provide an improved process for treating particulate soybean material in high solids concentrations of at least about 75 to about 90% solids concentration by a combined treatment of the said particulate material with water soluble protonic acids and/or their water soluble salts in conjunction with hydrogen peroxide, and effect thereby an improved reduction in soy odor and flavor and unexpectedly eliminating the bitter soy flavor without changing desirable or favorable native characteristics.

Another object of this invention relates to an improved combination of chemical treatment of particulate soybean materials, at high solid levels, in non-slurry form, and effecting the production of light colored particulate soybean materials without the normal soybean odor and taste, making the treated particulate soybean material more acceptable for use at high levels in white bread, health breads, specialty breads and alimentary products both with and without added egg solids, or milk.

Further objects and advantages will be recognized from the following description. To the accomplishment of the foregoing and related ends, this invention comprises the improved features hereinafter more fully described and inherent therein, and as particularly pointed out in the claims. The following examples describe the method of application in applied chemical treatment, these being indicative, however, of but a few of the various ways in which the principle of the invention or improvement may be employed.

In an overall embodiment, the invention is concerned with providing an improvement in the use of soy flour in foods with improved soy flour. The flour is prepared by the process of simultaneous or stepwise treatment of relatively dry particulate soybean material with water soluble protonic acids and/or their water soluble ionizable salts in combination with hydrogen peroxide and then drying. Drying is effected in any conventional or suitable manner to facilitate and provide modification of the treated soybean material without necessitating separation of the constituents of the particulate soybean material. This chemical treatment surprisingly removes or improves odor, flavor and mixing properties without impairment of baking and baked qualities of the finished product. These improvements and qualities remain, even when the multiple chemical treatment is finished without any isolation or partial isolation other than drying of the treated particulate soybean material. In general, in a practical plant application the treatment is applied to conventionally prepared defatted and de-solventized soybean flakes as they come from the processing unit at a temperature of about 190°–210° F. While the treatment may be affected during an intermediate stage of the conventional processing and before or after de-fatting, the preferred process is carried out after de-fatting and, in any case, at about 75% to about 90% soybean solids level. The treatment is simply followed by removal of any excess water, by a normal or accelerated process of evaporation, prior to storage and use, or any other additional mechanical processing.

The acids are water soluble and may be either organic or inorganic and are protonic as defined by the Bronstad-Lowry theory. As indicated, the salts of these water solubel organic or inorganic acids must also be ionizable. The acids and salts are preferably of a class suitable for human consumption. Such salts and/or acidic water soluble chemical compounds may be synthetically produced as those obtained for example in using sea water. For preparation of edible chemically treated soybean products, such protonic acids and salts derived therefrom are exemplified as: sodium chloride, calcium chloride, acetic acid, citric acid, phosphoric acid and hydrochloric acid, and the like. One or more of which is used in combination with the hydrogen peroxide. The concentration of the acid and/or its salt, and the hydrogen peroxide, may be from about 0.5 part to about 5 parts and preferably is on the order of about 1 part to about 2 parts for each based on 100 parts of the particuates of protein containing vegetable material. The monovalent metal salts, if used alone, are in concentrations of over 0.5% and preferably in combination with a divalent metal salt. In addition, this process includes the treatment of such particulate soybean material, and mixtures thereof with other particulates of protein containing vegetable material, with other nutritionally required or essential minerals, such as iron, copper, manganese, cobalt, zinc, and the like which are applied inclusively as water soluble salts, of protonic acids in combination with the hydrogen peroxide treatment. The overall result produces a similar effect of change in water dispersibility of the protein and a change in other physical factors. In the event the chemical acid or salt thereof is non-edible, it has been found that when processed in the manner herein provided, the soy particulates has an enhanced value in commercial uses.

The following examples illustrate the process embodied herein and the surprising and unusual results obtained at the high solids level of treatment without isolation or partial isolation of any of the reactants, as such, other than drying. Subsequent use may be in the particulate form in which the material is treated or the treated material may be otherwise mechanically processed to a desired usable from.

EXAMPLE I

A solution of calcium chloride and hydrogen peroxide was sprayed onto hexane extracted soybean flakes at 70–80° C. while blending in such a manner, i.e. in a baffled rotating drum or high-speed mechanical blender, so as to obtain uniform distribution of the solution. The treated soybean flakes were air dried to equilibrium moisture and ground to pass 100% through a 200-mesh screen.

The proportions, hereinafter expressed in parts by weight, for chemical treatment were:

| | Parts |
|---|---|
| Soybean flakes | 100 |
| $CaCl_2.2H_2O$ | 3 |
| $H_2O_2$ (50%) | 1 |
| $H_2O$ | 15 |

EXAMPLE II

A solution of $H_3PO_4$, $CaCl_2$, $H_2O_2$ in water was sprayed onto hexane extracted soybean flakes at 70–80° C. with thorough agitation such that the solution had maximum opportunity for even distribution on the soybean product. Increasing the moisture content to about 20% established more ideal conditions for migration of the aqueous solution throughout the flakes. The treated soybean flakes were air dried to equilibrium moisture and ground on a Weber hammer mill and classified on a Rotap to pass 100% through a 200-mesh screen.

The components for treatment were:

| | Parts |
|---|---|
| Soybean flakes | 100 |
| $H_3PO_4$ (85%) | 2.5 |
| $CaCl_2.2H_2O$ | 3 |
| $H_2O_2$ (50%) | 2 |
| $H_2O$ | 15 |

EXAMPLE III

A solution of citric acid and $H_2O_2$ in water was sprayed onto hexane extracted soybean flakes at 70–80° C. with thorough agitation such that the solution had maximum opportunity for even distribution on the dry soybean product. Increasing the moisture content to about 20% established more ideal conditions for migration of the aqueous solution throughout the flakes. The chemically treated soybean flakes were allowed to air dry to equilibrium moisture, ground and classified to 100% through a 200-mesh screen.

The components for treatment were:

| | Parts |
|---|---|
| Soybean flakes | 100 |
| Citric acid | 3 |
| $H_2O_2$ (50%) | 1 |
| $H_2O$ | 15 |

EXAMPLE IV

A solution of acetic acid and hydrogen peroxide in water was sprayed onto hexane extracted soybean flakes at 70–80° C. with agitation such that the solution had maximum opportunity for even distribution on the dry soy product. Increasing the moisture content to about 20% established more ideal conditions for migration of the aqueous solution throughout the flakes. The chemically treated soybean flakes were air dried to moisture equilibrium, ground and classified to 100% through a 200-mesh screen.

The components for treatment were:

| | Parts |
|---|---|
| Soybean flakes | 100 |
| Glacial acetic acid | 3 |
| $H_2O_2$ (50%) | 2 |
| $H_2O$ | 15 |

EXAMPLE V

An aqueous solution of $CaCl_2$, was sprayed onto dehulled, hexane extracted soybean flakes at room temperature with agitation such that the solution had maximum opportunity for even distribution on the dry soy products. This treated product was allowed to come to moisture equilibrium and subsequently treated with $H_2O_2$ under the same conditions as described above. In the laboratory, a moisture content of about 20% is more ideal for uniform migration of an aqueous solution throughout the flakes. In plant production less moisture and on the order of 15% was found to be preferred. The chemically treated flakes were air dried to equilibrium moisture, ground and classified to 100% through a 200 mesh screen.

The components for treatment were:
First step:

| | Parts |
|---|---|
| Soybean flakes | 100 |
| $CaCl_2.2H_2O$ | 3 |
| $H_2O$ | 15 |

Second step:

| | |
|---|---|
| 50% $H_2O_2$ | 1 |
| $H_2O$ | 15 |

EXAMPLE VI

Same as Example V except the $CaCl_2$ was added to dehulled, full-fat flakes prior to hexane extraction of the oil. Subsequent treatment with $H_2O_2$ was carried out on the hexane extracted $CaCl_2$ treated soybean flakes. Components for treatment same as for Example V.

EXAMPLE VII

Same as Example V except $CaCl_2$ replaced by citric acid (3 parts).

EXAMPLE VIII

Same as Example VI except $CaCl_2$ replaced by 3 parts of citric acid.

EXAMPLE IX

Same as Example V with 15 parts prepared solution of normal sea water having a total salt concentration of about 1 part substituted for the calcium chloride and water. Ocean water may be evaporated to a desired salt content, if necessary, and similarly utilized.

EXAMPLE X

Same as Example V substituting 3 parts of sodium chloride for the calcium chloride.

EXAMPLE XI

Same as Example VII substituting cotton seed meal for the soybean flakes. The cotton seed meal can also be treated by the other acids and salts described in combination with hydrogen peroxide.

EXAMPLES XII TO XXXII

The following table shows results of using the indicated salts with 1 part of 50% hydrogen peroxide in 15 parts water and utilized in treating 100 parts soybean flakes, by the method described in Example I.

| Salt used | Parts | Water dispersible protein [1] | | |
|---|---|---|---|---|
| | | pH | Percent | Percent at pH 6.6 |
| $BaCl_2$ | 0.75 | 6.3 | 29.4 | 41.2 |
| | 1.5 | 5.8 | 12.8 | 15.0 |
| | 3.0 | 5.6 | 8.9 | 8.9 |
| $CaCl_2$ | 1.0 | 6.1 | 19.6 | 33.1 |
| | 2.0 | 5.9 | 9.6 | 14.8 |
| | 3.0 | 5.7 | 7.6 | 10.4 |
| | 4.0 | 5.6 | 7.1 | 9.0 |
| | 5.0 | 5.6 | 7.8 | 9.6 |
| $ZnCl_2$ | 0.75 | 6.0 | 20.35 | 34.8 |
| | 1.5 | 5.75 | 9.5 | 15.4 |
| | 3.0 | 5.32 | 4.9 | 4.9 |
| $CoCl_2$ | 0.75 | 6.2 | 41.0 | 44.4 |
| | 1.5 | 6.0 | 23.4 | 40.4 |
| | 3.0 | 5.7 | 11.6 | 16.0 |
| $AlCl_3$ | 0.75 | 6.0 | 27.9 | 44.3 |
| | 1.5 | 5.7 | 9.6 | 23.9 |
| | 3.0 | 5.1 | 5.6 | 8.4 |
| $FeCl_3$ | 0.75 | 6.1 | 28.3 | 45.1 |
| | 1.5 | 5.6 | 11.6 | 23.2 |
| | 3.0 | 4.9 | 5.1 | 8.5 |
| No treatment | | 6.6 | 50.6 | 50.6 |

[1] Determination was made according to the method described in JAOC Society, vol. 37, No. 4, pp. 165–171.

Theories of the effect of the combination of chemical treatments with protonic acids and/or their water soluble mono and polyvalent metal salts and hydrogen peroxides as described, may be expounded. However, the unexpected results, which are obtained with uniform elimination of the bitter odor and taste can be better illustrated by practical application. Advantages of utilizing the chemically treated soybean material in standard formulations are hereinafter illustrated.

For example, 25 parts of the ground product of Example I was added to 75 parts by weight semolina and this mixture utilized in preparing a macaroni product by a conventional plant processing. Other preparations of conventional macaroni formulations were made using varying quantities of from 12.5% to 45% prepared ground soybean material with cereal flour, durum flour and other wheat products, as used in the production of semolina, durum flour and other typical wheat and cereal or alimentary products. Noodles prepared with up to 45% of the ground treated flake, by a conventional process showed firmness and like the other alimentary products resistance to stretch, when formed. Taste panel evaluations showed that no objectional soy odor or flavor is detectable. In addition, such products were improved in resistance to overcooking with decreased water absorption and substantially improved nutritional protein value. In fact, 12.5%, 17%, and 25% of the dry chemically treated soybean material, in combination with typical durum wheat products yields a vegetable protein combination which is 75% to 80% and more as efficient as milk for promoting growth, as determined by animal assays. In addition, the high level of protein is retained in such alimentary and other products when properly cooked.

The high content soybean products are surprisingly edible without the usual bitter soy taste and odor and the cooking qualities have not been altered in the manner characteristic of toasted soybean material.

It has also been found that the chemically treated soybean products, as described, can be used at normal and high levels in the bread baking industry. The bread is prepared in a conventional formulation with from 2% to about 20% of the combined chemically treated soybean material added or substituted for the usual bread flour. For example, comparative results showing bakes prepared by conventional bread baking formulation and utilizing 5% of the indicated treated soybean flour are illustrated in Table I.

In addition, the preferably treated soybean material can be used in making soybean cereal and other foods with a suitable edible binder. The treated soybean particulates are also used in meat compositions, as in making sausage, without imparting a soy odor and soy taste. As will be understood the herein described treatment can be applied to other members of the legume family as bean flour, pea flour, or the like and particulates of such legume or other particulates of protein containing vegetable material as peanut flour and the like which require such treatment, if desired, for extending their use in foods.

*Table I*

| Identification of soy flour | Treatment of soy flour | Volume (percent of std.) | Grain & Texture | Body | Color | Odor |
|---|---|---|---|---|---|---|
| Standard, no soy (4% non-fat dry milk) | | 100 | Close, thin elongated velvety cell structure | Strong | 100 | Normal. |
| Bakers Nutrisoy | Slight heat treatment | 93 | Sl. open, sl. thick, round sl. harsh cell structure | Medium strong | 96 | Soy. |
| 878-110-M | 3% $CaCl_2 \cdot 2H_2O$ plus 0.5% (50%) $H_2O_2$ | 102 | Close, thin, elongated, velvety cell structure | Strong | 97 | Normal. |
| 878-110-R(1) | 3% $CaCl_2 \cdot 2H_2O$ plus 1% (50%) $H_2O_2$ | 109 | ----do---- | ----do---- | 99 | Do. |
| 1009-78-1 | 2% $CaCl_2$ plus 1% (50% $H_2O_2$) | 100 | ----do---- | ----do---- | 97 | Do. |
| 87-110-0 | 2.5% citric acid plus 1.0% (50%) $H_2O_2$ | 110 | Close, thin, round, velvety cell structure | ----do---- | 98 | Do. |

This chemical treatment inactivates oxidizing enzymes. Thus, it is of advantage to similarly treat prepared mixtures of the particulates, as semolina, etc., or their component parts, and mix, to reduce rancidity during storage, preparatory to eventual use.

From the above description, it will be apparent that some modifications and variations of the invention and improvement as hereintofore set forth may be made without departing from the spirit and scope thereof. The specific embodiments described are given by way of examples illustrative of the invention and improvement which is to be limited only by the terms of the appended claims.

I claim:

1. The process of removing soybean odor and soybean taste from particulates of soybean material containing protein and carbohydrate constituents comprising the steps of chemically treating particulate soybean material with chemical materials selected from the group consisting of water soluble ionizable protonic acids, the water soluble mono- and polyvalent ionizable metal salts of such acids, and mixtures of the same; and hydrogen peroxide, each in water solution providing concentrations of about 0.5 part to about 5 parts based on 100 parts of the particulates of soybean material, maintaining the particulates of soybean material at a high solids level of about 75% to about 90% while in contact with a said chemical material and the hydrogen peroxide until the particulates are relatively thoroughly wetted thereby, and drying the particulates of soybean material.

2. The process of claim 1 wherein, the chemical material is a water soluble alkaline metal salt derivative of the said protonic acid in admixture with hydrogen peroxide.

3. A soybean containing food product containing a soybean material treated by the process of claim 1.

4. The process of chemically treating particulates of legume material comprising the steps of mixing particulates of legume material with chemical materials selected from the group consisting of water soluble ionizable protonic acids, the water soluble mono- and polyvalent ionizable metal salts of such acids, and mixtures of the same, and hydrogen peroxide each in water solution providing concentrations of from about 0.5 parts to about 5 parts based on 100 parts of the particulates of legume material, maintaining the said particulates in non-slurry form and at a high solids level of about 75% to about 90% while in contact with said chemical materials and said hydrogen peroxide until the water is thoroughly adsorbed, and drying the particulates of legume material.

5. The product obtained by the process of claim 4.

6. A legume containing food product containing a legume material treated by the process of claim 4.

7. The process of chemically treating particulates of protein containing vegetable material with a chemical material selected from the group consisting of ionizable and water soluble edible protonic acids, water soluble mono- and polyvalent ionizable metal salts of such acids and mixtures thereof comprising the steps of mixing a said chemical material and hydrogen peroxide each in water solution providing concentrations of about 0.5 part to about 5 parts relative to about 100 parts of particulates of said vegetable material, maintaining the particulate solids level at about 70% to about 90% while thoroughly mixing a said chemical therewith to moisten the surfaces of said particulate material, and thereafter drying the mixture.

8. The process of claim 7 wherein, the particulate vegetable material is in flake form and selected from the group consisting of prefabricated defatted particulates of soybean material, cotton seed material and peanut material and the process comprises first treating about 100 parts of the said flake material with about 15 parts of a water solution of said chemical material followed by about 15 parts of a water solution of said hydrogen peroxide.

9. A product produced by the process of claim 7.

10. A food product containing the treated product of claim 7.

References Cited in the file of this patent

UNITED STATES PATENTS

| | | |
|---|---|---|
| 1,510,606 | Phillips | Oct. 7, 1924 |
| 1,912,895 | Gossel | June 6, 1933 |
| 2,322,516 | Horvath | June 22, 1943 |
| 2,930,700 | Bradof | Mar. 29, 1960 |